Sept. 24, 1957　　　　　B. STARLING　　　　　2,807,337
HYDRAULIC BRAKING SYSTEM FOR VEHICLES INCLUDING DECELERATION RESPONSIVE
MEANS FOR AUTOMATICALLY CHANGING THE RATIO OF BRAKING
BETWEEN THE FRONT AND REAR WHEELS
Filed May 24, 1954
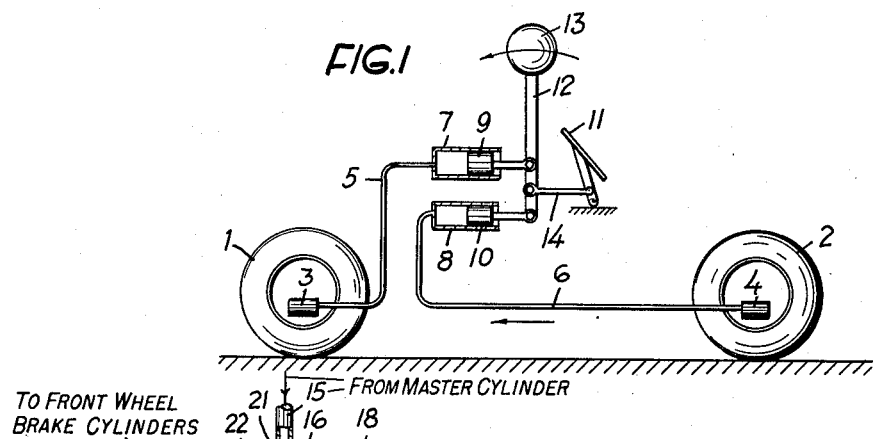
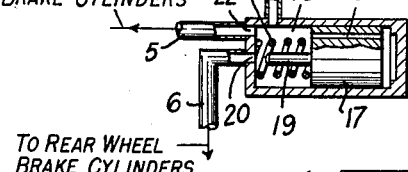
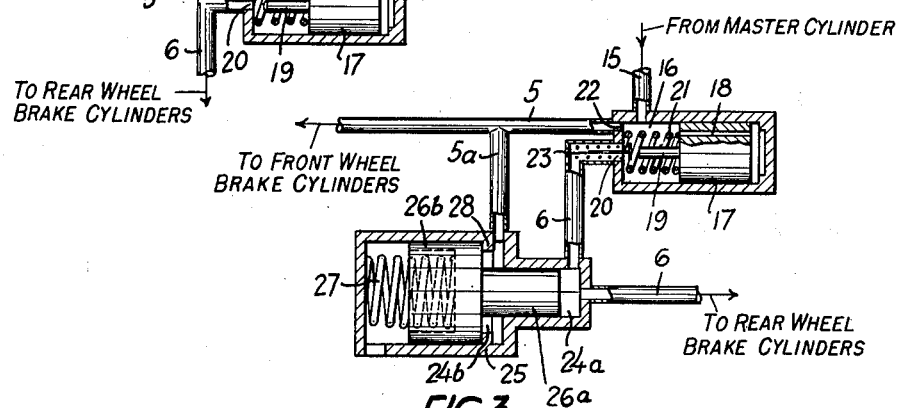
INVENTOR
Bengt Starling
BY Pierce, Scheffler & Parker
ATTORNEY

United States Patent Office 2,807,337
Patented Sept. 24, 1957

2,807,337

HYDRAULIC BRAKING SYSTEM FOR VEHICLES INCLUDING DECELERATION RESPONSIVE MEANS FOR AUTOMATICALLY CHANGING THE RATIO OF BRAKING BETWEEN THE FRONT AND REAR WHEELS

Bengt Starling, Goteborg, Sweden, assignor to Svenska Bromsbandsfabriken Aktiebolag, Molnlycke, Sweden, a corporation of Sweden Application May 24, 1954, Serial No. 431,995

Claims priority, application Sweden May 27, 1953

2 Claims. (Cl. 188—152)

In the braking of a motor car with 4-wheel-brakes, for example, a torsional moment originating from the brakes will be obtained on the vehicle proper, said moment tending to raise the rear wheels from the ground. Thus a transfer of the wheel pressure takes place from the rear wheels to the front wheels, which may in turn result in that the rear wheels become locked and slip on account of a reduction of the normal pressure. The present invention has for its object to prevent said drawback, and the invention consequently refers to an arrangement in braking systems for vehicles, preferably hydraulic brakes provided with a common operating member to apply the brakes both on the front wheels and on the rear wheels, said arrangement comprising a weight or the like actuated by the retardation and movable in the longitudinal direction of the vehicle, characterized in that the weight is adapted when moving to throttle or control the supply of medium under pressure to the brakes of the rear wheels, whereas the supply to the brakes of the front wheels is unimpeded.

The invention will be explained more closely in the following with reference to the accompanying drawing, wherein Fig. 1 is a diagrammatic view of a braking system arranged according to the invention for a motor car, for example, whereas Figs. 2 and 3 show two different forms of embodiment of valve contrivances for hydraulic braking systems constructed in accordance with the invention.

Fig. 1 is primarily intended to elucidate the effect aimed at. In this figure, the wheels 1 and 2 are conceived of as being the front wheels and the rear wheels of a motor car, while the associated braking cylinders of the hydraulic braking system are designated by 3 and 4, respectively. The braking cylinders 3 and 4 are each connected with master cylinders 7 and 8 through the conduits 5 and 6, respectively, the pistons 9 and 10 of said cylinders being adapted to be actuated over a linkage by means of a braking pedal 11.

A yoke 12 connecting the pistons 9 and 10 extends upwardly and carries a weight 13 at the upper end thereof.

If the vehicle is conceived of as moving in the direction of the arrow and the pedal 11 is depressed, one and the same braking effect is taken to be obtained both on the front wheels and on the rear wheels. On account of the retardation setting in, the weight 13 tends to swing in the direction of the curved arrow, which involves that the piston 9 tends to become displaced further inwardly in the cylinder 7, whereas the piston 10 tends to withdraw from the cylinder 8, the yoke 12 being then conceived of as swinging substantially about the pivot of the link 14 at the yoke. Said tendency of the weight 13 thus results in that the braking power on the front wheels 1 increases, whereas the braking power on the rear wheels 2 decreases.

In the arrangement according to Fig. 1, two master cylinders are provided. Figures 2 and 3 show valve contrivances intended to be used in systems where the operating member actuates one master cylinder only, from which conduits extend to the braking cylinders for the front wheels and rear wheels.

In Fig. 2, 15 denotes a conduit extending from a master cylinder, said conduit opening into a chamber 16, which is of a cylindrical cross section in the example shown. The chamber 16 has a piston 17 slidably mounted therein, said piston being provided with one or more bores 18 connecting both sides of the piston with one another. Extending from the piston 17 is a stem 19, the free end of which is formed as a valve cone and adapted to cooperate with a centrally arranged outlet opening 20 in one end wall of the chamber 16. Arranged about the stem 19 is a spring 21 tending to move the piston 17 away from the opening 20. In the end wall having the opening 20 in it there is provided a further opening 22, conduits extending from the openings 20 and 22 being designated by 6 and 5, respectively, in agreement with the designations in Fig. 1, said conduits leading to the rear wheels and the front wheels of the vehicle, respectively.

The cylindrical chamber 16 has its axial extension in the longitudinal direction of the vehicle. When the braking pedal is depressed, an increase of the pressure is brought about in the conduit 15, the chamber 16 and the conduits 5 and 6, whereby the brakes are caused to function and the vehicle is retarded. At a certain retardation, the piston 17 on account of its weight and at compression of the spring 21 is pressed forwardly toward the opening 20, which is closed by the end of the stem 19. Thereafter, continued depression of the braking pedal will not cause any increase of the pressure in the conduit 6 leading to the rear wheels, which are thus braked with a constant power, whereas the front wheels are braked more powerfully. The pressure in the chamber 16 aids toward keeping the stem 19 pressed against the opening 20.

When the braking pedal is raised, the pressure will be lowered in the chamber 16, and since the retardation will then have ceased, the piston 17 is moved back by the spring 21.

In the embodiment according to Fig. 3, all of the details of the arrangement according to Fig. 2 are to be found, with the difference, however, that the opening 20 is adapted to be closed by means of a special spring-actuated poppet valve member 23 adapted to be operated by the piston stem 19.

According to Fig. 3, the conduit 6 leading to the rear wheels passes through an expansible chamber constituted by the cylinder space 24a in which slides the smaller diametered portion 26a of a stepped piston device 25, while a branch conduit 5a extends from the conduit 5 leading to the front wheels, said branch conduit opening into the larger cylinder portion 24b of the stepped piston device. The larger diametered piston portion of this device is denoted by 26b, and is actuated by a compression spring 27 tending to keep the piston pressed against an abutment 28 in the larger cylinder portion.

In the manner described with reference to Fig. 2, the conduit 6 leading to the rear wheels will be shut off from the remainder of the pressure system, when a certain retardation is exceeded. A continued depression of the braking pedal results in an increase of the pressure in the conduit 5 leading to the front wheels and at the same time also in the larger cylinder portion 24b of the stepped piston device, and the increased pressure can then gradually press away the stepped piston 26a, 26b against the action of the spring 27. Hereby, the volume of the expansible chamber constituted by the cylinder space 24a is increased, which results in a lowering of the pressure in the conduit 6, which involves a reduction of the braking power on the rear wheels.

As will appear from the description hereinabove, the invention has for its object in dependence on the magnitude of the retardation to bring about a stronger braking effect on the front wheels than on the rear wheels. In the diagrammatic arrangement shown in Fig. 1, which may be applied with a certain modification also in a mechanical braking system, the transfer of the braking power takes place from the rear wheels to the front wheels continuously as a function of the retardation, whereas in the two other embodiments a restriction of the braking power on the rear wheels is attained, when a certain retardation is exceeded.

The invention is not limited to the embodiments shown in the drawing and described hereinabove, but may be modified in its details within the scope of the following claims.

What I claim is:

1. An arrangement in hydraulic braking systems for vehicles comprising a master cylinder and hydraulic brakes acting on the front and rear wheels of the vehicle, conduits connecting said master cylinder with said brakes, a housing interposed in and forming part of the conduit leading to the rear wheel brakes, a valve in said conduit opening into said housing and controlling the pressure on the braking fluid from said housing through said conduit leading to said rear wheel brakes, said valve including a valve closure member normally spring urged in the direction of said housing to an open position, a weight separate from said valve closure member and slidable in said housing and a loading spring in said housing urging said weight in a direction away from said valve closure member, said weight being slidable in said housing against the counter action of said loading spring in the direction of and engaging said valve closure member as a result of forces arising from deceleration of the vehicle to move said valve closure member to a closed position thereby limiting the braking pressure applied to said rear wheel brakes.

2. A hydraulic braking system as defined in claim 1 and which further includes means comprising an expansible chamber in said conduit leading to said rear wheel brakes, and means responsive to an increase in pressure in said conduit leading to said front wheel brakes subsequent to said closure of said valve for increasing the volume of said expansible chamber to thus decrease the braking pressure applied to said rear wheel brakes.

References Cited in the file of this patent

UNITED STATES PATENTS

| | | |
|---|---|---|
| 2,115,071 | Hunt | Apr. 26, 1938 |
| 2,151,278 | Milhaupt | Mar. 21, 1939 |
| 2,182,463 | Beeston | Dec. 5, 1939 |
| 2,242,297 | Freeman | May 20, 1941 |
| 2,512,427 | Heller | June 20, 1950 |